(12) United States Patent  
Rinne et al.

(10) Patent No.: US 7,218,936 B2  
(45) Date of Patent: May 15, 2007

(54) TRANSMITTING OF CELL MANAGEMENT INFORMATION IN A CELLULAR COMMUNICATION NETWORK

(75) Inventors: Mikko J. Rinne, Mikko (FI); Antti Lappeteläinen, Espoo (FI); Jussi Ojala, Helsinki (FI)

(73) Assignee: Nokia Corporation, Espoo (FI)

( * ) Notice: Subject to any disclaimer, the term of this patent is extended or adjusted under 35 U.S.C. 154(b) by 200 days.

(21) Appl. No.: 10/937,296

(22) Filed: Sep. 10, 2004

(65) Prior Publication Data

US 2006/0009210 A1    Jan. 12, 2006

(30) Foreign Application Priority Data

Jul. 7, 2004    (EP)    ................... 04015993

(51) Int. Cl.
- *H04Q 7/20* (2006.01)
- *H04Q 7/00* (2006.01)
- *H04J 3/00* (2006.01)
- *H04B 7/216* (2006.01)
- *H04B 7/212* (2006.01)

(52) U.S. Cl. ................ 455/447; 455/425; 370/330; 370/337; 370/441; 370/442

(58) Field of Classification Search ............... 455/423, 455/425, 447, 450, 452.1, 442, 502, 422, 455/466, 562, 403, 438, 25, 456.3; 370/330, 370/337, 441, 442

See application file for complete search history.

(56) References Cited

U.S. PATENT DOCUMENTS

| | | | |
|---|---|---|---|
| 5,774,790 A | 6/1998 | Dupuy | |
| 6,259,685 B1 | 7/2001 | Rinne et al. | |
| 6,611,695 B1 * | 8/2003 | Periyalwar | ................ 455/450 |
| 6,658,257 B1 * | 12/2003 | Hirayama et al. | .......... 455/451 |
| 6,952,408 B2 * | 10/2005 | Schwaller et al. | .......... 370/314 |

* cited by examiner

*Primary Examiner*—Naghmeh Mehrpour  
(74) *Attorney, Agent, or Firm*—Squire, Sanders & Dempsey L.L.P.

(57) ABSTRACT

A method, system, and functional elements for transmitting cell management information in a cellular communication network, in which each cell comprises a base station communicating using at least one frequency and is defined by a radio coverage area of its base station, wherein a communication between a mobile station and a base station is based on a time frame structure comprising a plurality of time slots, in which transmitting time slots in the time frame structures of neighboring base stations, in which time slots cell management information relating to the respective cell is to be transmitted, are shifted against each other on a time basis. The transmitting of cell management information can be based on a predetermined transmission parameter, the value of which is representative of the radio coverage area of a base station.

62 Claims, 5 Drawing Sheets

TRANSMITTING OF CELL MANAGEMENT INFORMATION IN A CELLULAR COMMUNICATION NETWORK

FIELD OF THE INVENTION

The present invention relates to a method, functional elements, and a system of transmitting cell management information in a cellular communication network. In particular, the present invention relates to an implementation of a scheme for a time-based frequency reuse based on a transmission parameter such as transmission power and/or radiation pattern of a base station in e.g. a mobile communication network of the fourth generation (4G).

BACKGROUND OF THE INVENTION

Mobile communication systems have been developed with the aim to facilitate communication everywhere, with everyone and at any time. In recent years, mobile communication systems, and particularly cellular communication systems, experienced a huge increase, both in the number of users and in the quality and demands of services offered.

Commonly used and widely spread mobile communication systems such as the pan-European Global System for Mobile Communication (GSM) are cellular systems. A cellular system or network is characterized in that it is organized on a cell basis, wherein each cell comprises a base station whose radio coverage area defines the geographical spreading of this cell.

Since only a limited frequency band is available for an entire mobile communication network and each communication channel requires a certain bandwidth, it is essential to exploit the available frequency band as efficient as possible such that as many users as possible can be serviced in the network. Therefore, in a cellular network, the available frequencies are usually reused on a cell basis. This means that the same set of frequencies, i.e. the same frequency band, which is used in one cell are also used in another cell of the same system in order to increase the user capacity of the system. However, in this regard, there exists a drawback in that interferences between the communications of users in different cells may occur, when the same frequencies are used. Such interferences are desired to be avoided since the communication quality is deteriorated due to them. Thus, the same frequencies are to be reused only in cells which are spaced at a minimum distance from each other. This distance is usually called spatial frequency reuse D (see FIG. 1). However, the larger distance D is and, thus, the lower potential interferences are, the fewer users can be serviced in the system, i.e. the lower the capacity of the system is. That is the spatial frequency reuse D is desired to be as small as possible, in particular in view of an increasing number of users.

In FIG. 1, a cell structure of a cellular mobile communication system is depicted according to the hexagon model, i.e. each cell is illustrated as a hexagon, irrespective of its actual physical shape. The number in each cell denotes a certain set of frequencies, i.e. a certain frequency band, which is allocated to this cell. According to FIG. 1, three frequency bands 1, 2, 3 are exemplarily used and a cell using frequency band 1 is surrounded by cells using frequency bands 2 and 3. This results in a frequency reuse factor k being 3.

Within one cell communications are effected in so-called channels. In the GSM system, for example, the channel allocation comprises a segmentation of channels both in the frequency domain and in the time domain. Thus, by dividing the available frequencies in an uplink band (for communication between a mobile station and a base station) and a downlink band (for communication between a base station and a mobile station) a frequency division duplex (FDD) technique is implemented. Further, by dividing an uplink/downlink band in a time frame structure comprising time slots, a time division duplex (TDD) technique is implemented. Other communication systems may use one of these techniques, either FDD or TDD, or a combination of these.

In order to cope with the increasing requirements mentioned above in terms of number of users and demands of services, which are posed on mobile communications, mobile systems and networks of the third generation (3G) and even the fourth generation (4G) are under development and partly already in operation, e.g. the General Packet Radio Service (GPRS) and the Universal Mobile Telecommunication System (UMTS).

The current working assumption for a 4G cellular system in a high frequency bandwidth requirement amounts to 1 Gbps (Gigabits per second) in maximum data rate. To achieve reasonable multi-operator scenarios in view of such-like requirements and with limited total bandwidth availability, the frequency reuse factor in the network must be low. Further, for a continuous coverage of the whole cell by its base station, pilot and broadcast channels must be receivable over the whole cell area, which may also result in overlaps with neighboring cells. However, such overlaps are adverse with respect to the aim of a smaller frequency reuse factor, since overlaps between cells using the same frequency bands would again result in deteriorating interferences.

Generally, an overlapping can be avoided or, at least, reduced by accordingly affecting the transmission powers of cells using the same frequency band. A method for channel allocation utilizing power restrictions is presented in U.S. Pat. No. 6,259,685. In this method the time-slotted transmissions of synchronized base stations are arranged in such a way that transmissions utilizing maximum power P do not occur at the same time t in cells sharing the same frequency band.

The principle of a time-slotted transmission power scheme according to the cited prior art solution is illustrated in FIG. 2. The figure shows the power restrictions of the base station for a situation of three neighboring cells, with P denoting the transmission power of the base station of the respective cell and t denoting the time. In a normal situation, the single timeslots are allocated to different terminals at different geographical locations.

This prior art method results in a kind of "breathing" in the cell coverage areas, which would in this case be the desired outcome producing the spatial overlap in the border zone between two cells, enabling camping of a mobile station on either cell.

However, there are shortcomings of the prior art solution according to FIG. 2 in that it is not specified, in which time slot or time slots pilot and/or broadcast channels are transmitted. That is, there is no regulation provided by this method on how to arrange transmissions of cell management information such as pilot and broadcast channels, both within a time frame structure of a cell as well as in relation to neighboring cells.

Hence, on the one hand, it is possible that pilot and broadcast channels of different cells using the same frequencies are transmitted at the same time instant or clashing time instants. Even though in this case, the transmissions would have different power levels, which reduces a risk of spatial overlapping, a mobile station receiving all of the three transmissions of cell management information would not be able to conduct correct measurements of the cell management information relating to neighboring cells. Thus, it is at least difficult for the mobile station to select the most suitable cell or base station to assign to.

On the other hand, in case pilot and/or broadcast channels are transmitted in time slots with a low transmission power P, an overlapping might be avoided or reduced, but a full and continuous coverage of the whole cell area may not be ensured. Thus, a mobile station being located in (the border zone of) the actual cell area may not be able to receive pilot and/or broadcast channels, whereby the mobile station does not obtain the necessary cell management information. Moreover, if the power of the pilot signal is not synchronized to the power limits and becomes variable, the "cell breathing" results in unwanted continuous handovers between base stations.

Thus, a solution to the above problems and drawbacks is desirable for a cellular communication network, in which frequency reuse possibilities are limited.

SUMMARY OF THE INVENTION

Consequently, it is an object of the present invention to alleviate the above drawbacks inherent to the prior art and to provide an improved transmission of cell management information in a mobile communication network.

According to a first aspect of the invention, this object is for example achieved by a method for transmitting cell management information in a cellular communication network, in which each cell comprises a base station communicating using at least one frequency and is defined by a radio coverage area of its base station, wherein a communication between a mobile station and a base station is based on a time frame structure comprising a plurality of time slots, said method comprising a step of defining one or more time slots in the time frame structures of neighboring base stations, in which time slots cell management information relating to the respective cell is to be transmitted, wherein said defined time slots of neighboring base stations are shifted against each other on a time basis.

According to further advantageous developments:
the defining is based on a predetermined transmission parameter, wherein a value of said predetermined transmission parameter is assigned to each time slot;
the value of said predetermined transmission parameter is adjusted on a time slot basis in the time frame structures of neighboring base stations, wherein time slots with maximum values of said predetermined transmission parameter are shifted against each other on a time basis;
the value of said predetermined transmission parameter is representative of the radio coverage area of the base station when transmitting the respective time slot;
the cell management information is transmitted in time slots, in which said predetermined transmission parameter has a respective maximum value;
the value of said predetermined transmission parameter of time slots with cell management information is fixed;
the value of said predetermined transmission parameter of a time slot with cell management information is included in another time slot with cell management information;
the base stations of said cellular communication network are operated in a time-synchronized manner;
time slots with cell management information are transmitted in a downlink transmission direction;
a downlink transmission direction is changed to an uplink transmission direction after every i-th succession of time slots with cell management information at neighboring base stations, with i being an integer number equal or larger than 1;
an uplink transmission direction is changed to a downlink transmission direction before an occurrence of a time slot with cell management information; and
the method is applied to downlink frequency bands, uplink frequency bands, or both of these.

According to a second aspect of the invention, this object is for example achieved by a base station of a cellular communication network, in which each cell comprises a base station communicating using at least one frequency and is defined by a radio coverage area of its base station, wherein a communication between a mobile station and said base station is based on a time frame structure comprising a plurality of time slots, said base station being configured to be operated according to a method of transmitting cell management information and comprising a defining means being configured for defining one or more time slots in its time frame structure, in which time slots cell management information relating to its cell is to be transmitted, in accordance with a respective defining of time slots in the time frame structures of neighboring base stations, wherein said defined time slots of the base station in question and neighboring base stations are shifted against each other on a time basis.

According to further advantageous developments:
the defining means is configured for defining based on a predetermined transmission parameter, wherein a value of said predetermined transmission parameter is assigned to each time slot capable of being defined;
the base station further comprises an adjusting means being configured for adjusting said value of said predetermined transmission parameter on a time slot basis in accordance with an adjusting of said value of said predetermined transmission parameter at neighboring base stations, wherein time slots with maximum values of said predetermined transmission parameter of the base station in question and neighboring base stations are shifted against each other on a time basis;
the defining means is configured for defining time slots with maximum values of said predetermined transmission parameter for transmitting cell management information;
the base station further comprises signaling means being configured for signaling a timing offset of the time slots with a maximum value of said predetermined transmission parameter of its neighboring base stations;
the base station further comprises communicating means being configured for communicating with other base stations and/or at least one mobile station;
the communicating means are further configured for scheduling uplink transmissions of mobile stations with which the base station communicates; and
the base station is operated in a time-synchronized manner with the other base stations of said mobile cellular communication network.

According to a third aspect of the invention, this object is for example achieved by a mobile station of a cellular communication network, in which each cell comprises a base station communicating using at least one frequency and is defined by a radio coverage area of its base station, wherein a communication between a mobile station and said base station is based on a time frame structure comprising a plurality of time slots, said mobile station being configured to be operated according to a method of transmitting cell management information and comprising communicating means being configured for receiving time frame structures with cell management information relating to at least one base station; detecting means being configured for detecting a value of a predetermined transmission parameter being assigned to each time slot of the received time frame structures; and selecting means being configured for selecting a preferred base station to assign to on the basis of the detected values of the transmission parameter of the time frame structures relating to at least one base station.

According to further advantageous developments:

the mobile station further comprises estimating means being configured for estimating, according to a predetermined equation, timing offsets of time slots of neighboring base stations, which time slots have a maximum value of a predetermined transmission parameter;

the estimating means are further configured for estimating a target value of said transmission parameter for each uplink time slot, said target value being required by said mobile station for being able to transmit information to at least one base station;

the communication means are further configured for setting a threshold value of said transmission parameter to uplink time slots; and the communication means are further configured for scheduling uplink data to time slots with an appropriate value of said transmission parameter and for transmitting said uplink data and any other information to at least one base station.

According to a fourth aspect of the invention, this object is for example achieved by a system of transmitting cell management information in a cellular communication network, in which each cell comprises a base station communicating using at least one frequency and is defined by a radio coverage area of its base station, wherein a communication between a mobile station and a base station is based on a time frame comprising a plurality of time slots, in which system time slots in the time frame structures of neighboring base stations, in which time slots cell management information relating to a respective cell is to be transmitted, are shifted against each other on a time basis, said system comprising a base station according to the second aspect of the present invention and a mobile station according to the third aspect of the present invention.

Referring to all above aspects of the present invention, the following advantageous points apply:

the value of the predetermined transmission parameter is representative of the radio coverage area of a base station when transmitting the respective time slot;

the predetermined transmission parameter comprises a transmission power of a base station, a radiation pattern of a transmission antenna of a base station, or a combination of these;

the cell management information comprises one or more of a pilot signal, a training sequence, and system information; and the cellular communication network is operated on the basis of a time division duplex technique or a frequency division duplex technique.

It is an advantage of the present invention that cell management information transmissions of neighboring base stations, i.e. cells, occur at different times.

Thus, it is an advantage of the present invention that a mobile station is able to analyze the cell management information relating to several cells correctly and to select the most suitable cell on the basis of the analyzed information.

It is a further advantage of the present invention that a denser frequency/channel reuse, i.e. a lower frequency reuse factor, and thus a higher user capacity in a cellular communication network is provided.

It is another advantage of the present invention that full coverage and neighbor measurements in a non-CDMA system are facilitated.

With the embodiments of the present invention, a scheme for a time-based frequency reuse for a TDD system as well as for a FDD system is provided.

With the embodiments of the present invention, a scheme for a time-based frequency reuse based on a transmission power of a base station as well as based on a radiation pattern of a base station's transmission antenna is provided.

The present invention improves prior art solutions by defining the time slot positions where pilot symbols, training sequences and system information transmissions should occur. All of these three types of cell management information should be transmitted with relatively high power using an antenna configuration of a base station, which defines the downlink coverage area of the cell. By defining the location where pilot and system information is provided to be the high-power timeslots of each cell, it can be guaranteed that pilot transmissions of neighboring cells do not overlap in time. This enables terminals to conduct handover measurements of neighboring cells when the peak power and cell identity for each base station can be decoded at separate time instants.

Furthermore, the frequency reuse scheme according to the present invention can be based on a transmission parameter which is representative of the radio coverage area of a base station.

Another novelty over the prior art is an extension of the concept to use in time division duplex systems, where downlink and uplink are alternating in time in the same frequency band.

BRIEF DESCRIPTION OF THE DRAWINGS

In the following, the present invention will be described in greater detail with reference to the accompanying drawings, in which.

DETAILED DESCRIPTION OF EMBODIMENTS OF THE PRESENT INVENTION

The present invention is intended for a cellular system where frequency reuse possibilities are limited. Primary target applications are to facilitate full coverage and neighbor measurements in a non-CDMA system and to extend the underlying basic principle to a TDD system. However, the present invention is not restricted thereto, but other types of systems such as CDMA systems and FDD systems can also be enhanced by applying the present invention.

It is assumed throughout the invention that there is a time synchronization between cells, i.e. that the base stations of the mobile communication network are operated in a time-synchronized manner. To achieve high capacity in a continuous-coverage TDD system, synchronization is believed to be necessary. Also in an FDD environment time synchronization is advantageous, since especially handover performance can be improved by cell synchronization.

Figure 3:
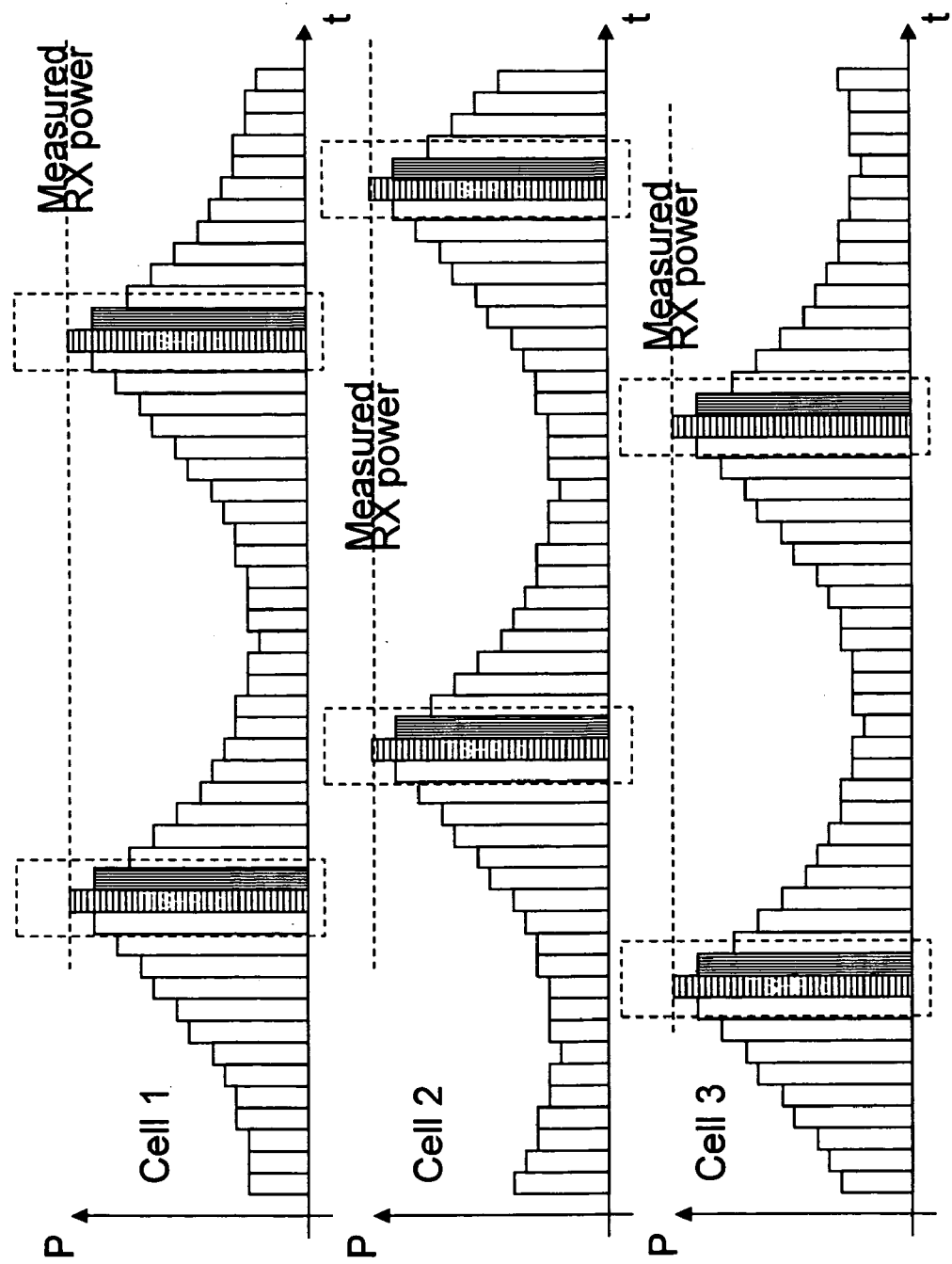
FIG. 3 shows a time-slotted transmission power scheme according to the present invention.

According to FIG. 3, a time-slotted transmission power scheme according to the invention is depicted, which exemplifies the situation for three cells using the same frequency bands. For each of the three cells, a single timing diagram is shown, in which the x-axis denotes the time and the y-axis denotes the output transmission power of the base station of the respective cell, respectively. It can be seen that the output transmission power of the single time slots (which are denoted by bars) are arranged in a manner according to the cited prior art solution. The maximum transmission power time slots of the different cells do not overlap in time.

According to an embodiment of the present invention, in an environment where time-based frequency reuse is generated by specifying timeslot-specific power restrictions for each base station, it is specified that cell management information such as a pilot channel, a training sequence and system information are transmitted at fixed positions in the high-power timeslots of a radio frame.

This principle is illustrated in FIG. 3, where transversely hatched bars represent time slots containing, for example, a training sequence and a pilot signal, and where lengthwise hatched bars represent time slots containing, for example, system information. It is noticeable that the hatched cell management information time slots of the different cells do not occur at the same time instants. Rather, the different time slots of base stations of neighboring cells 1, 2 and 3, in which time slots cell management information is to be transmitted, are shifted against each other on a time basis.

After an initial power-on, a mobile station seeks the preferred cell by looking for the known pilot transmissions. This is performed measurements of the pilot transmissions of the singe cells, which are performed in time periods which are denoted by dashed boxes in FIG. 3. As stated above, the pilot transmissions in the present embodiment occur at the high-power timeslots of each cell and can, in a synchronized system, for neighboring base stations be guaranteed to occur at different times. Accordingly, the single pilot transmissions of the single cells can be measured by the mobile station temporally separated from each other, which yields correct results in deciding for the preferred cell on the basis of the single cell management information.

In more general terms, a method of transmitting cell management information in a cellular communication network is performed, wherein a communication between a mobile station and a base station is based on a time frame structure comprising a plurality of time slots, comprises a defining of one or more time slots in the time frame structures of neighboring base stations, in which time slots cell management information relating to the respective cell is to be transmitted, wherein said defined time slots of neighboring base stations are shifted against each other on a time basis.

In the example depicted in FIG. 3, the definition of time slots for cell management information is based on the base stations' transmission power of each time slot. In this case, the transmission power is only one example for a transmission parameter, whose value is representative of the radio coverage area of the base station when transmitting the respective time slot. Such a value of the parameter is assigned to each time slot for the purpose of cell management information transmission. Another example for the transmission parameter is a radiation pattern of a transmission antenna of the base stations, or a combination of both alternatives.

The transmission parameter my be adjusted on a time slot basis in the time frame structure of neighboring base stations, with the time slots having a maximum value of the transmission parameter being shifted against each other on a time basis.

As a further aspect, the pilot transmission power can be fixed for the time slots with cell management information, in which case received power measurements at the mobile station can give a better estimate of the downlink channel pathloss. Such a pathloss may serve as a parameter for a mobile station's decision for the preferred cell. This aspect is illustrated by horizontal dashed lines labeled with "Measured RX power", which are flushed with the peak transmission power bars of the timing diagrams of FIG. 3, which corresponds to an assumption of an ideal channel.

In case the pilot transmission power is variable, the mobile station has to be informed about the output pilot transmission power in order to be able to determine the channel pathloss on the basis of the received (RX) power measured. Then, the pilot transmission power is to be broadcast in another time slot with cell management information, e.g. the time slot with the system information (the lengthwise hatched bars in FIG. 3).

During mobility, neighbor measurements can be carried out in a similar fashion as the initial cell management information measurements. The pilot sequences transmitted at peak powers will occur at different times for neighboring cells, so the cells can be separated from each other even in the border zones and a correct evaluation of the best cell can be made, even during mobility of the mobile station when seeking its preferred cell.

Figure 4:
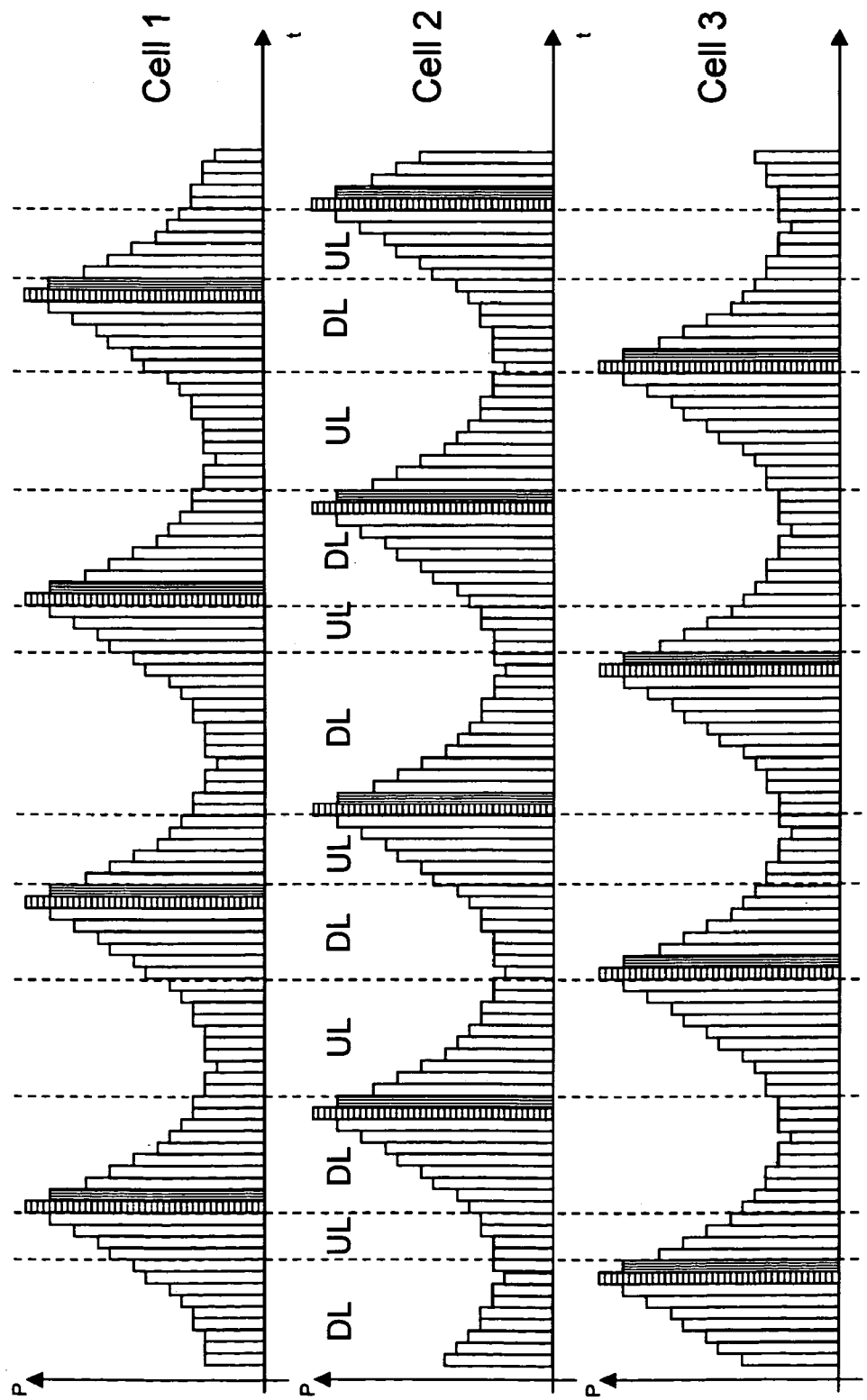
FIG. 4 shows a time-slotted transmission power scheme for a TDD system according to the present invention.

According to FIG. 4, which shows a time-slotted transmission power scheme for a TDD system according to the invention, another embodiment of the present invention is illustrated. The composition of FIG. 4 is comparable to that of FIG. 3 in that three timing diagrams for three neighboring cells using the same frequency bands are shown. The time slots containing cell management information are also represented by transversely and lengthwise hatched bars. Since a time division duplex system is concerned, where downlink and uplink are alternating in time on the same frequency band, time periods of uplink transmission direction are denoted by UL, whereas time periods of downlink transmission direction are denoted by DL, wherein the single time periods are divided by vertical dashed lines. It can be seen that, due to a time synchronization of the cells, uplink and downlink time periods occur simultaneously at the different base stations, i.e. in the different cells 1, 2, 3.

According to the present embodiment, the basic scheme according to FIG. 3 is extended to a TDD system (FIG. 4). The background is that no schemes for a time-based reuse based on transmission power are known to have been presented for a TDD system so far.

Figure 1:
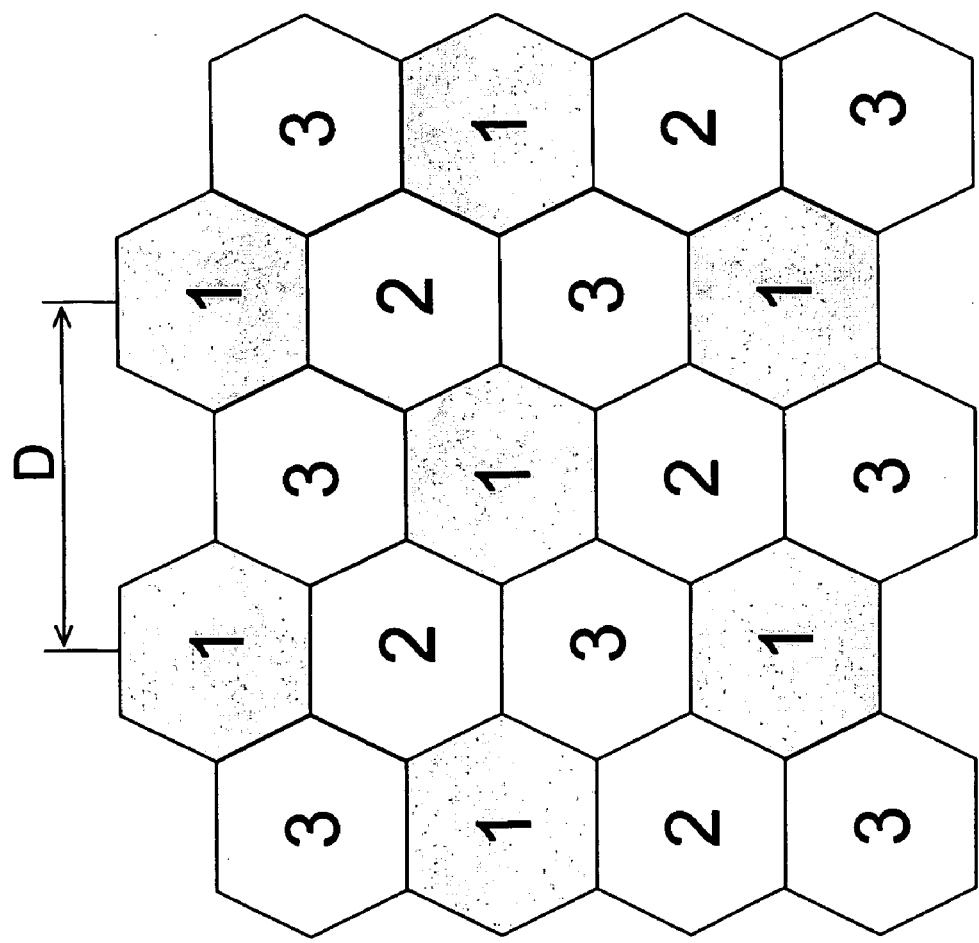
FIG. 1 shows a cell structure of a cellular mobile communication network according to the hexagon model.
Figure 2:
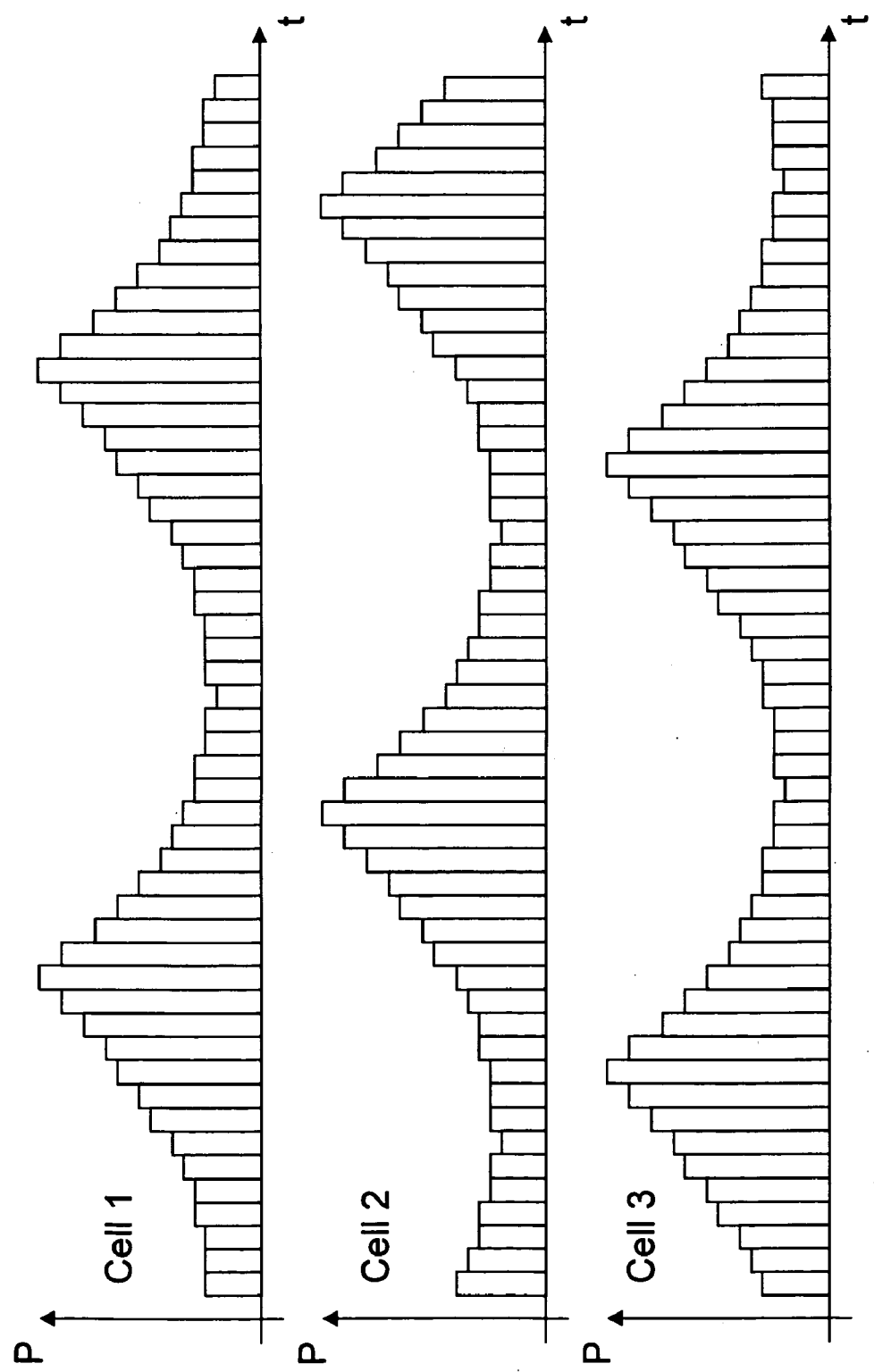
FIG. 2 shows a time-slotted transmission power scheme according to the prior art.

Various implementation alternatives are possible according to the present embodiment. As an example, only one implementation alternative is shown here, which is again exemplified for an environment with three cells. The three cells shown e.g. in FIG. 4, i.e. their respective base stations, operate on the same frequencies. Accordingly, when the shown implementation is applied to a frequency re-use of 3, all three of these cells would be assumed to be e.g. on frequency 1 (or all on frequency 2, or all on frequency 3; see FIG. 1). The same implementation according to FIG. 4 could also be used for a re-use 1 environment. However, it would be difficult to achieve full coverage, but at least the gaps between the cells could be reduced. In this regard, it is to be noted that the time re-use created by the slot-specific power limits improves cell isolation, but it is not necessarily needed in case there is an adequate frequency separation, i.e. a sufficiently high frequency reuse is used.

The rule for this example is as follows: uplink and downlink alternate between each succession of cell management information time slots, i.e. time slots containing training sequence TS+pilot signal+system information. In this regard, it is to be noted that (although not depicted in FIG. 4) a slower alternating of link directions is also possible, wherein the change can occur at every second, every third, every fourth etc. cell management information transmission in the reuse grid. More specifically, the cell management information block consisting of one or more time slots is always transmitted in downlink direction, but after an occurrence in any of the three cells of the example, which appears in different timings, the link direction is changed from downlink to uplink. Also, the link direction is changed from uplink to downlink before the next occurrence of a time slot with cell management information.

According to FIG. 4, the initial downlink period is changed after an occurrence of hatched bars (representing time slots with cell management information) of cell 3. The subsequent uplink period ends with the occurrence of hatched bars of cell 1, which have to be transmitted in downlink transmission direction and, thus, in a downlink period which ends with the occurrence of hatched bars of cell 2. Accordingly, each downlink period begins with an occurrence of cell management information time slots in one cell and ends with an occurrence of cell management information time slots in another cell. The sequence of such occurrences in the present example of FIG. 4 is cell 3-cell 1-cell 2-etc.

In this manner, different cell sites, i.e. base stations, get equal opportunities for low-power and high-power time slots both in downlink and in uplink, resulting in a similar time-based reuse pattern in downlink and in uplink. Using the above described rule, the basic scheme can be extended to any level or factor of frequency reuse.

For the uplink operation, the base station needs information about the transmit power (more generally, the value of the transmission parameter) required by the mobile station to transmit information to the base station. Further, the base station needs means to schedule the uplink transmissions of the mobile stations, with which it communicates, in such a way that the mobile stations requiring a high transmit power get permission to transmit in the time slots where high power is allocated and other mobile stations get permission to transmit in the time slots with more restrictive power limitations. Therefor, the mobile stations of the invention have to have a capability (means) to estimate the mobile station output power for a given time slot and a capability (means) to transmit the estimation to the base station concerned. Furthermore, a means to set a threshold value for a maximum transmit power for the mobile station for each timeslot as requested by the base station is to be provided as well as a capability to schedule uplink data to time slots with appropriate power restrictions as instructed by the base station. This is because, even though the allocation may be done taking pathloss into account, fast fading combined with fast power control may result in situations where the interference to the neighbor would be too high, even though the own base station cannot be reached either.

Further, the implementation of the present invention includes a possibility that the maximum transmission power for some time slots is zero, which leads to a partial time reuse. Further, it is possible that base stations belonging to the same time group, i.e. having overlapping power maxima, can each have independent absolute power value thresholds.

In a TDD system, the random access channels should be allocated to uplink time slots with a respective maximum power value of the predetermined transmission parameter. This is due to the lack of a priori direction-of-arrival estimate at the receiving base station.

For the above facet of the invention, a situation has to be created where the mobile station operates the same way in the uplink direction as the base station operates in the downlink direction. In certain time slots, mobile stations in a certain sector of the cell may use higher transmit powers than in other time slots (in which mobile stations under an adjacent base station may use higher power). The reason for allocating the high-power time slots for the random access channel is that random access is generally based on open-loop power estimates, which are not as precise as a (fast) closed-loop power control. (In TDD systems, power control is based on continuous measurements.) In the high-power time slots, there is more headroom, i.e. a larger margin, for power estimation errors than in more restrictively regulated low-power time slots.

The present invention can also be applied to a frequency division duplex (FDD) system, in which the above explained concept relating to the downlink band can also be extended to the uplink band, or both the downlink and the uplink band. In that case, random access channels should utilize (uplink) time slots, in which the predetermined transmission parameter has a respective maximum value. In the present example, random access channels should be allocated to maximum power time slots.

Generally, in order to fully utilize the benefits of the invention, irrespective of whether uplink or downlink transmission is concerned, the link scheduling should first schedule the traffic to those time slots that have the maximum power allocation, regardless of the transmission power actually used.

According to the above described aspects of the present invention, the transmission power of respective base stations is adjusted on a time slot basis (see FIGS. 3 and 4). The time-dependent output power thresholds presented in these figures are conventionally defined as [energy/time unit]. In general, as already mentioned above, it is desirable to adjust a parameter on a time slot basis, whose value is representative of the radio coverage area of the base station of the respective cell. This is due to the fact that a cell is defined by the radio coverage area of its base station, and that the (full) coverage of the cell area is one of the underlying target applications of the present invention.

Thus, according to another aspect of the present invention, it is also possible to achieve the benefits of the invention by restricting a radiation pattern of a transmission antenna of a base station in question instead of the output transmission power.

In the case of restricting antenna radiation pattern, a directional antenna with a variable directivity coefficient may be used at the base stations of the mobile communication network in order to adjust the radio coverage areas of the base stations of the respective cells. Then, an antenna directivity coefficient C [unit radian or steradian] replaces power P as the y-axis unit in FIGS. 3 and 4. The antenna directivity coefficient is defined, for example, as angle inside which the transmitted signal is attenuated less than 3 dBi from the maximum gain.

It is further possible to use a combination of the transmission power and the radiation pattern of the transmission antenna of the base station in question. In the case of restricting antenna radiation pattern and the output power, the y-axis in FIGS. 3 and 4 contains both P and C in a certain mathematical relation.

Figure 5:
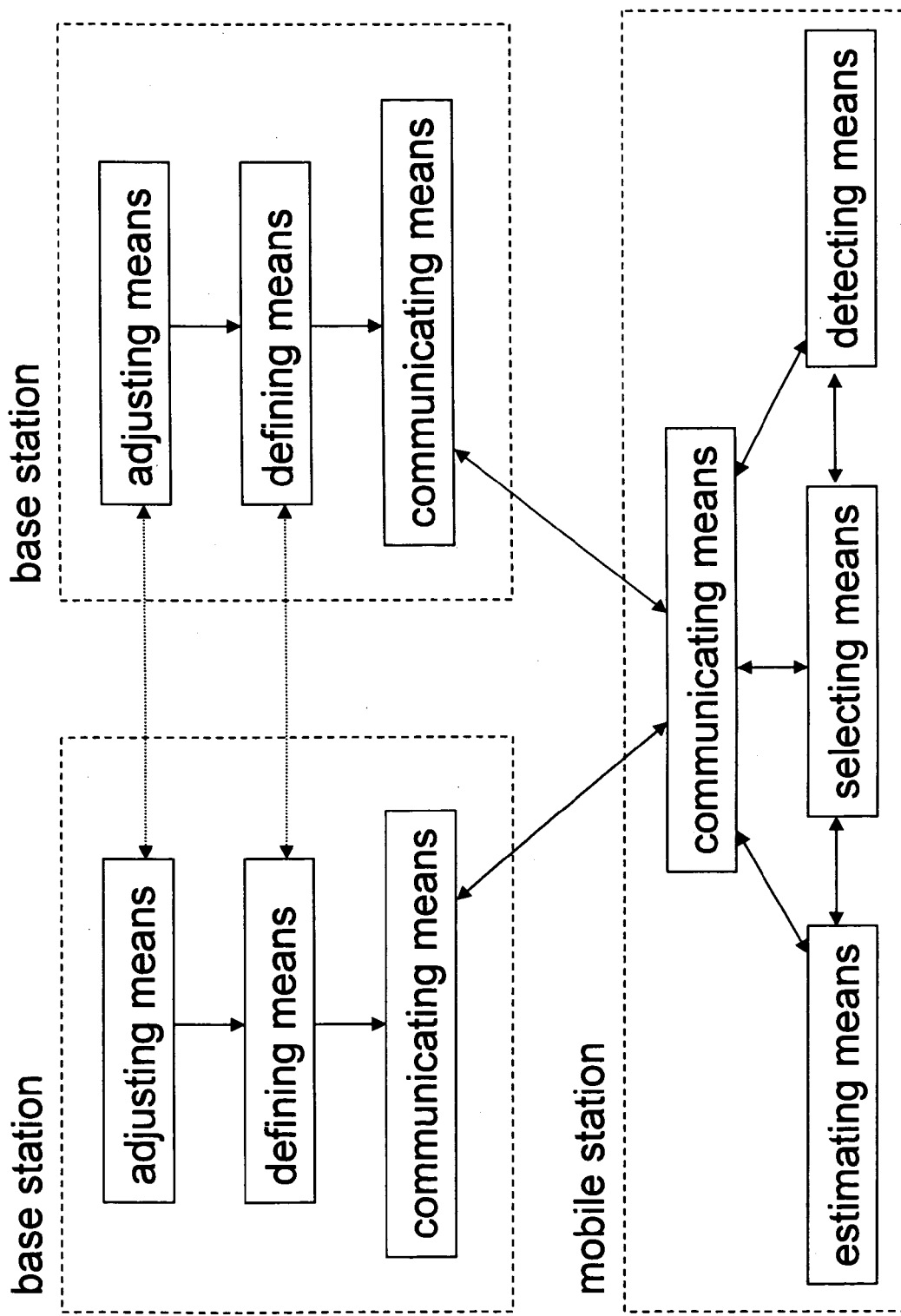
FIG. 5 shows a block diagram of base stations and a mobile station according to an embodiment of the present invention.

FIG. 5 shows a block diagram of base stations and a mobile station according to an embodiment of the present invention. In other words, a system according to an embodiment of the present invention is shown, which comprises at least one base station and at least one mobile station according to above aspects of the present invention. A base station and a mobile station according to the present invention are configured to be operated according to a method of transmitting cell management information according to the present invention. Both can be operated in a mobile communication network being operated on a time division duplex technique or a frequency division duplex technique, respectively.

The direction of one-headed solid arrow lines in FIG. 5 indicates a processing sequence, whereas double-headed solid arrow lines indicate a bidirectional communication between connected means. The double-headed dotted arrow lines denote a coordination between the connected means.

According to FIG. 5, two base stations of a cellular communication network are exemplarily shown, which are operated in a time-synchronized manner. Each of the depicted base stations comprises an adjusting means for adjusting a value of a transmission parameter on a time slot basis in accordance with an adjusting of a value of the transmission parameter at neighboring base stations, which is performed by adjusting means of the other base stations. According to one example, like the one explained above, the adjusting is performed such that time slots with maximum values of the transmission parameter, e.g. with maximum output transmission power, of neighboring base stations are shifted against each other on a time bases. The interdependence of the adjusting at several base stations is denoted by the double-headed dotted arrow lines between the adjusting means. Each base station further comprises a defining means for defining one or more time slots in the time frame structure of the respective base station, in which time slots cell management information such as a training sequence, a pilot signal or system information is to be transmitted. The defining as well is accomplished in accordance with a defining of time slots in the time frame structure of neighboring base stations, which interdependence of the defining at several base stations is denoted by the double-headed dotted arrow lines between the defining means. The outcome of the defining by the defining means is that the time slots with cell management information relating to neighboring base stations are shifted against each other in a time bases, i.e. that these time slots do not overlap in time.

According to an example according to the present invention, the defining is based on the above-mentioned transmission parameter being adjusted by the adjusting means. In such a case, it is possible that the cell management information transmission takes place in maximum output power time slots, which has the advantage of a full cell coverage.

For being able to communicate with each other, the base station and the mobile station according to the present invention also comprise communicating means, although such communicating means such as a transceiver are already known for base stations and mobile stations of communication networks. Furthermore, according to the present invention, the communicating means of the base stations are further configured for scheduling uplink transmissions of mobile stations with which the base station communicates.

A base station of the present invention may e.g. broadcast a signaling of a timing offset of the time slots with a maximum value of the transmission parameter of its neighboring base stations. For this purpose, a base station of the present invention may comprise respectively configured signaling means (not shown).

A base station in the sense of this specification can be any network element of a cellular communication network, which realizes a connection of a mobile equipment to the network itself. Thus, respective elements of the GSM, GPRS, UMTS or any other system may be concerned.

The mobile station according to FIG. 5 also comprises a communicating means being configured for receiving time frame structures with cell management information relating to at least one cell, i.e. of at least one base station of the cellular communication network, detecting means being configured for detecting a value of a predetermined transmission parameter being assigned to each time slot of the received time frame structures, and selecting means for selecting a preferred base station to assign to. This selection is performed on the basis of the detected values of the transmission parameter of the time frame structures relating to at least one base station.

As can be seen from FIG. 5, a mobile station according to the depicted embodiment of the present invention may further comprise an estimating means for estimating timing offsets of maximum transmission parameter value time slots of neighboring base stations according to a predetermined equation.

According to one embodiment of the present invention, which is directed to the uplink transmission direction, the estimating means are further configured for estimating a target value of said transmission parameter for each uplink time slot, said target value being required by said mobile station for being able to transmit information to at least one base station. Further, the communication means are configured for setting a threshold value of said transmission parameter to uplink time slots, and for scheduling uplink data to time slots with an appropriate value of said transmission parameter as well as for transmitting said uplink data and any other information to at least one base station.

Such an estimation of e.g. the power maxima offsets between neighboring base stations (and the own base station) can be accomplished by using the following equation:

$$[(I_n \% m) - (I_{own} \% m)] \times t_{offset}, \quad \text{(Equation 1)}$$

where $I_n$ and $I_{own}$ are index values associated to the neighboring base station and the own base station, respectively, % is the modulo operator, m is the amount of power maxima at a superframe, i.e. a certain time period of the time frame structure, and $t_{offset}$ is the timing difference of two consecutive power maxima. The estimated power maxima offset information can be used e.g. for minimizing radio frequency (RF) activity related to handover procedures of a mobile station between cells.

The cellular communication network, within which the functional elements of FIG. 5 operate, can be operated on the basis of a time division duplex technique as well as on the basis of a frequency division duplex technique. The transmission parameter can be a output transmission power of a respective base station, a radiation pattern of a transmission antenna of a respective base station, or a combination of these. The cell management information may comprise a pilot signal, a training sequence, system information, or any combination of these.

It is to be noted that the mentioned functional elements, i.e. the base station and the mobile station according to the present invention, and their constituents can be implemented by any known means, either in hardware and/or software, respectively, if it is only adapted to perform the described functions of the respective parts. For example, the adjusting means of a base station can be implemented by any data processing unit, e.g. a microprocessor, being adapted to adjust a predetermined transmission parameter in a time frame structure on a time slot basis according to the method of the present invention. The mentioned parts can also be realized in individual functional blocks or by individual means, or one or more of the mentioned parts can be realized in a single functional block or by a single means.

The embodiments of the present invention can also include signaling protocols and/or preprogrammed logic that enhance the benefits of the invention.

A method, system, and functional elements for transmitting cell management information in a cellular communication network are disclosed, in which each cell comprises a base station communicating using at least one frequency and is defined by a radio coverage area of its base station, wherein a communication between a mobile station and a base station is based on a time frame structure comprising a plurality of time slots, in which transmitting time slots in the time frame structures of neighboring base stations, in which time slots cell management information relating to the respective cell is to be transmitted, are shifted against each other on a time basis. The transmitting of cell management information can be based on a predetermined transmission parameter, the value of which is representative of the radio coverage area of a base station.

The invention extends prior art solutions by defining pilot transmission slots in such a way that pilot transmissions from neighboring cells do not overlap in time and can be separately measured by a terminal or mobile station. Thereby, a pilot structure supporting a time-based frequency reuse scheme is provided. Additionally, an extension to the basic scheme to cover a TDD system, where uplink and downlink alternate on the same frequency band, is presented.

Even though the invention is described above with reference to the examples according to the accompanying drawings, it is clear that the invention is not restricted thereto. Rather, it is apparent to those skilled in the art that the present invention can be modified in many ways without departing from the scope of the inventive idea as disclosed in the appended claims.

The invention claimed is:

1. A method of transmitting cell management information in a cellular communication network, in which each cell comprises a base station communicating using at least one frequency and is defined by a radio coverage area of its base station, wherein a communication between a mobile station and a base station is based on a time frame structure comprising a plurality of time slots, said method comprising the step of:

defining at least one time slot in the time frame structures of neighboring base stations, in which time slots cell management information relating to a respective cell is to be transmitted, wherein said defined at least one time slot of the neighboring base stations are shifted against each other on a time basis.

2. The method according to claim 1, wherein said step of defining is based on a predetermined transmission parameter, wherein a value of said predetermined transmission parameter is assigned to each time slot.

3. The method according to claim 2, wherein said value of said predetermined transmission parameter is adjusted on a time slot basis in the time frame structures of the neighboring base stations, wherein time slots with maximum values of said predetermined transmission parameter are shifted against each other on a time basis.

4. The method according to claim 2, wherein said value of said predetermined transmission parameter is representative of a radio coverage area of a base station when transmitting a respective time slot.

5. The method according to claim 2, wherein cell management information is transmitted in time slots, in which said predetermined transmission parameter has a respective maximum value.

6. The method according to claim 2, wherein said value of said predetermined transmission parameter of time slots with cell management information is fixed.

7. The method according to claim 2, wherein said value of said predetermined transmission parameter of a time slot with cell management information is included in another time slot with cell management information.

8. The method according to claim 2, wherein said predetermined transmission parameter comprises at least one of a transmission power of a base station, and a radiation pattern of a transmission antenna of the base station.

9. The method according to claim 1, wherein said cell management information comprises at least one of a pilot signal, a training sequence, and system information.

10. The method according to claim 1, wherein base stations of a cellular communication network are operated in a time-synchronized manner.

11. The method according to claim 1, wherein a cellular communication network is operated on a basis of a time division duplex technique.

12. The method according to claim 11, wherein time slots with cell management information are transmitted in a downlink transmission direction.

13. The method according to claim 11, wherein a downlink transmission direction is changed to an uplink transmission direction after every i-th succession of time slots with cell management information at neighboring base stations, with i being an integer number equal or larger than 1.

14. The method according to claim 11, wherein an uplink transmission direction is changed to a downlink transmission direction before an occurrence of a time slot with cell management information.

15. The method according to claim 1, wherein a cellular communication network is operated on a basis of a frequency division duplex technique.

16. The method according to claim 15, said method being applied to at least one of downlink frequency bands, and uplink frequency bands.

17. A base station for a cellular communication network, wherein:

each cell comprises a base station communicating using at least one frequency and is defined by a radio coverage area of said base station, and a communication between a mobile station and said base station is based on a time frame structure comprising a plurality of time slots;

said base station being configured to be operated according to a method of transmitting cell management information and comprising a defining means for defining at least one time slot in the time frame structure, in which time slots cell management information relating to the cell is to be transmitted, in accordance with a respective defining of time slots in the time frame structures of neighboring base stations, wherein said defined at least one time slot of the base station in question and neighboring base stations are shifted against each other on a time basis.

18. The base station according to claim 17, wherein said defining means is configured for defining based on a predetermined transmission parameter, wherein a value of said predetermined transmission parameter is assigned to each time slot.

19. The base station according to claim 18, further comprising an adjusting means for adjusting said value of said predetermined transmission parameter on a time slot basis in accordance with an adjusting of said value of said predetermined transmission parameter at neighboring base stations, wherein time slots with maximum values of said predetermined transmission parameter of the base station in question and neighboring base stations are shifted against each other on a time basis.

20. The base station according to claim 18, wherein said value of said predetermined transmission parameter is representative of the radio coverage area of the base station when transmitting a respective time slot.

21. The base station according to claim 18, wherein said defining means is further configured for defining time slots for transmitting cell management information, in which said predetermined transmission parameter has a respective maximum value.

22. The base station according to claim 18, wherein the predetermined transmission parameter comprises at least one of a transmission power of said base station, and a radiation pattern of a transmission antenna of said base station.

23. The base station according to claim 18, further comprising signaling means for signaling a timing offset of the at least one time slot with a maximum value of said predetermined transmission parameter relating to its neighboring base stations.

24. The base station according to claim 17, further comprising communicating means for communicating with other base stations and at least one mobile station.

25. The base station according to claim 24, wherein the communicating means is further configured for scheduling uplink transmissions of mobile stations with which the base station communicates.

26. The base station according to claim 17, wherein said cell management information comprises at least one of a pilot signal, a training sequence, and a system information.

27. The base station according to claim 17, wherein said base station is operated in a time-synchronized manner with other base stations of a mobile cellular communication network.

28. The base station according to claim 17, wherein said cellular communication network is operated on a basis of a time division duplex technique.

29. The base station according to claim 17, wherein said cellular communication network is operated on a basis of a frequency division duplex technique.

30. A mobile station for a cellular communication network, in which each cell comprises a base station communicating using at least one frequency and is defined by a radio coverage area of its base station, wherein a communication between a mobile station and said base station is based on a time frame structure comprising a plurality of time slots, said mobile station being configured to be operated according to a method of transmitting cell management information and comprising:
communicating means for receiving time frame structures with cell management information relating to at least one base station;
detecting means for detecting a value of a predetermined transmission parameter which is assigned to each time slot of the received time frame structures; and
selecting means for selecting a preferred base station to assign to on the basis of the detected values of the predetermined transmission parameter of the time frame structures relating to at least one base station.

31. The mobile station according to claim 30, wherein said cell management information comprises at least one of a pilot signal, a training sequence, and a system information.

32. The mobile station according to claim 30, wherein said cellular communication network is operated on a basis of a time division duplex technique.

33. The mobile station according to claim 30, wherein said cellular communication network is operated on a basis of a frequency division duplex technique.

34. The mobile station according to claim 30, further comprising estimating means for estimating, according to a predetermined equation, timing offsets of time slots of neighboring base stations, wherein said time slots have a maximum value of the predetermined transmission parameter.

35. The mobile station according to claim 30, wherein said predetermined transmission parameter comprises at least one of a transmission power of a base station, and a radiation pattern of a transmission antenna of a base station.

36. The mobile station according to claim 34, wherein the estimating means is further configured for estimating a target value of said predetermined transmission parameter for each uplink time slot, said target value being required by said mobile station for being able to transmit information to at least one base station.

37. The mobile station according to claim 30, wherein the communicating means is further configured for setting a threshold value of said predetermined transmission parameter to uplink time slots.

38. The mobile station according to claim 30, wherein the communicating means is further configured for scheduling uplink data to time slots with an appropriate value of said predetermined transmission parameter and for transmitting said uplink data and any other information to at least one base station.

39. A system for transmitting cell management information in a cellular communication network, in which each cell comprises a base station communicating using at least one frequency and is defined by a radio coverage area of its base station, wherein a communication between a mobile station and a base station is based on a time frame structure comprising a plurality of time slots, in which system time slots in the time frame structures of neighboring base stations, in which time slots cell management information relating to a respective cell is to be transmitted, are shifted against each other on a time basis, said system comprising:
at least one base station being configured to be operated according to a method of transmitting cell management information and comprising a defining means for defining at least one time slot in the time frame structure, in which time slots cell management information relating to the cell is to be transmitted, in accordance with a respective defining of time slots in the time frame structures of neighboring base stations, wherein said defined at least one time slot of the base station in question and neighboring base stations are shifted against each other on a time basis; and at least one mobile station comprising communicating means for receiving time frame structures with cell management information relating to at least one base station, detecting means for detecting a value of a predetermined transmission parameter which is assigned to each time slot of the received time frame structures, and selecting means for selecting a preferred base station to assign to on the basis of the detected values of the predetermined transmission parameter of the time frame structures.

40. A base station for a cellular communication network, wherein:

each cell comprises a base station communicating using at least one frequency and is defined by a radio coverage area of said base station, and a communication between a mobile station and said base station is based on a time frame structure comprising a plurality of time slots;

said base station being configured to be operated according to a method of transmitting cell management information and comprising a defining unit for defining at least one time slot in the time frame structure, in which time slots cell management information relating to the cell is to be transmitted, in accordance with a respective defining of time slots in the time frame structures of neighboring base stations, wherein said defined at least one time slot of the base station in question and neighboring base stations are shifted against each other on a time basis.

41. The base station according to claim 40, wherein said defining unit is configured for defining based on a predetermined transmission parameter, wherein a value of said predetermined transmission parameter is assigned to each time slot.

42. The base station according to claim 41, further comprising an adjusting unit for adjusting said value of said predetermined transmission parameter on a time slot basis in accordance with an adjusting of said value of said predetermined transmission parameter at neighboring base stations, wherein time slots with maximum values of said predetermined transmission parameter of the base station in question and neighboring base stations are shifted against each other on a time basis.

43. The base station according to claim 41, wherein said value of said predetermined transmission parameter is representative of the radio coverage area of the base station when transmitting a respective time slot.

44. The base station according to claim 41, wherein said defining unit is further configured for defining time slots for transmitting cell management information, in which said predetermined transmission parameter has a respective maximum value.

45. The base station according to claim 41, wherein the predetermined transmission parameter comprises at least one of a transmission power of said base station, and a radiation pattern of a transmission antenna of said base station.

46. The base station according to claim 41, further comprising signaling unit for signaling a timing offset of the at least one time slot with a maximum value of said predetermined transmission parameter relating to its neighboring base stations.

47. The base station according to claim 40, further comprising communicating unit for communicating with other base stations and at least one mobile station.

48. The base station according to claim 47, wherein the communicating unit is further configured for scheduling uplink transmissions of mobile stations with which the base station communicates.

49. The base station according to claim 40, wherein said cell management information comprises at least one of a pilot signal, a training sequence, and a system information.

50. The base station according to claim 40, wherein said base station is operated in a time-synchronized manner with other base stations of a mobile cellular communication network.

51. The base station according to claim 40, wherein said cellular communication network is operated on a basis of a time division duplex technique.

52. The base station according to claim 40, wherein said cellular communication network is operated on a basis of a frequency division duplex technique.

53. A mobile station for a cellular communication network, in which each cell comprises a base station communicating using at least one frequency and is defined by a radio coverage area of its base station, wherein a communication between a mobile station and said base station is based on a time frame structure comprising a plurality of time slots, said mobile station being configured to be operated according to a method of transmitting cell management information and comprising:

communicating unit for receiving time frame structures with cell management information relating to at least one base station;

detecting unit for detecting a value of a predetermined transmission parameter which is assigned to each time slot of the received time frame structures; and selecting unit for selecting a preferred base station to assign to on the basis of the detected values of the predetermined transmission parameter of the time frame structures relating to at least one base station.

54. The mobile station according to claim 53, wherein said cell management information comprises at least one of a pilot signal, a training sequence, and a system information.

55. The mobile station according to claim 53, wherein said cellular communication network is operated on a basis of a time division duplex technique.

56. The mobile station according to claim 53, wherein said cellular communication network is operated on a basis of a frequency division duplex technique.

57. The mobile station according to claim 53, further comprising estimating unit for estimating, according to a predetermined equation, timing offsets of time slots of neighboring base stations, wherein said time slots have a maximum value of the predetermined transmission parameter.

58. The mobile station according to claim 53, wherein said predetermined transmission parameter comprises at least one of a transmission power of a base station, and a radiation pattern of a transmission antenna of a base station.

59. The mobile station according to claim 57, wherein the estimating unit is further configured for estimating a target value of said predetermined transmission parameter for each uplink time slot, said target value being required by said mobile station for being able to transmit information to at least one base station.

60. The mobile station according to claim 53, wherein the communicating unit is further configured for setting a threshold value of said predetermined transmission parameter to uplink time slots.

61. The mobile station according to claim 53, wherein the communicating unit is further configured for scheduling uplink data to time slots with an appropriate value of said predetermined transmission parameter and for transmitting said uplink data and any other information to at least one base station.

62. A system for transmitting cell management information in a cellular communication network, in which each cell comprises a base station communicating using at least one frequency and is defined by a radio coverage area of its base station, wherein a communication between a mobile station and a base station is based on a time frame structure comprising a plurality of time slots, in which system time slots in the time frame structures of neighboring base stations, in which time slots cell management information relating to a respective cell is to be transmitted, are shifted against each other on a time basis, said system comprising:

at least one base station being configured to be operated according to a method of transmitting cell management information and comprising a defining unit for defining at least one time slot in the time frame structure, in which time slots cell management information relating to the cell is to be transmitted, in accordance with a respective defining of time slots in the time frame structures of neighboring base stations, wherein said defined at least one time slot of the base station in question and neighboring base stations are shifted against each other on a time basis; and at least one mobile station comprising communicating unit for receiving time frame structures with cell management information relating to at least one base station, detecting unit for detecting a value of a predetermined transmission parameter which is assigned to each time slot of the received time frame structures, and selecting unit for selecting a preferred base station to assign to on the basis of the detected values of the predetermined transmission parameter of the time frame structures relating to at least one base station.

* * * * *